United States Patent [19]

Ammeraal

[11] Patent Number: 4,878,796
[45] Date of Patent: Nov. 7, 1989

[54] CONVEYING APPARATUS FOR LOADING AND UNLOADING GOODS, IN PARTICULAR FOR USE WITH SHIPS

[76] Inventor: Thomas C. M. Ammeraal, Zandweg 115, 1531 An Wormer, Netherlands

[21] Appl. No.: 162,162

[22] Filed: Feb. 29, 1988

[30] Foreign Application Priority Data

Mar. 3, 1987 [NL] Netherlands ............... 8700511

[51] Int. Cl.⁴ ............................................. B65G 67/60
[52] U.S. Cl. ............................. 414/141.7; 198/463.3; 414/140.8; 414/142.8
[58] Field of Search ............ 414/139, 140, 141, 140.8, 414/141.3, 141.7, 142.8; 198/448, 460, 463.3

[56] References Cited

U.S. PATENT DOCUMENTS

| | | | |
|---|---|---|---|
| 1,525,950 | 2/1925 | Prescott | 414/139 |
| 1,849,385 | 3/1932 | Sekulski | 198/463.3 |
| 3,520,396 | 7/1970 | Lingg | 414/139 X |
| 4,018,349 | 4/1977 | Hupkes | 414/139 X |
| 4,649,850 | 3/1987 | Akiba | 414/141 X |

FOREIGN PATENT DOCUMENTS

| | | | |
|---|---|---|---|
| 189218 | 7/1986 | European Pat. Off. | 414/139 |
| 1031730 | 3/1953 | France | 414/139 |
| 55-21339 | 2/1980 | Japan | 414/139 |
| 55-161733 | 12/1980 | Japan | 414/140 |
| 60-153331 | 8/1985 | Japan | 414/139 |

*Primary Examiner*—Robert J. Spar
*Assistant Examiner*—Janice Krizek
*Attorney, Agent, or Firm*—Wolf, Greenfield & Sacks

[57] ABSTRACT

A conveying apparatus for loading and unloading goods, in particular for use with ships, comprises a cage for transferring the goods. The cage is displaceable in vertical height by a hoist and is formed as a lift cage guided in a substantially vertical lift shaft having an encasement and forming part of a cage lift. The cage lift is provided with a lower loading and unloading point and an upper loading and unloading connected to a further conveyor having an encasement.

19 Claims, 6 Drawing Sheets

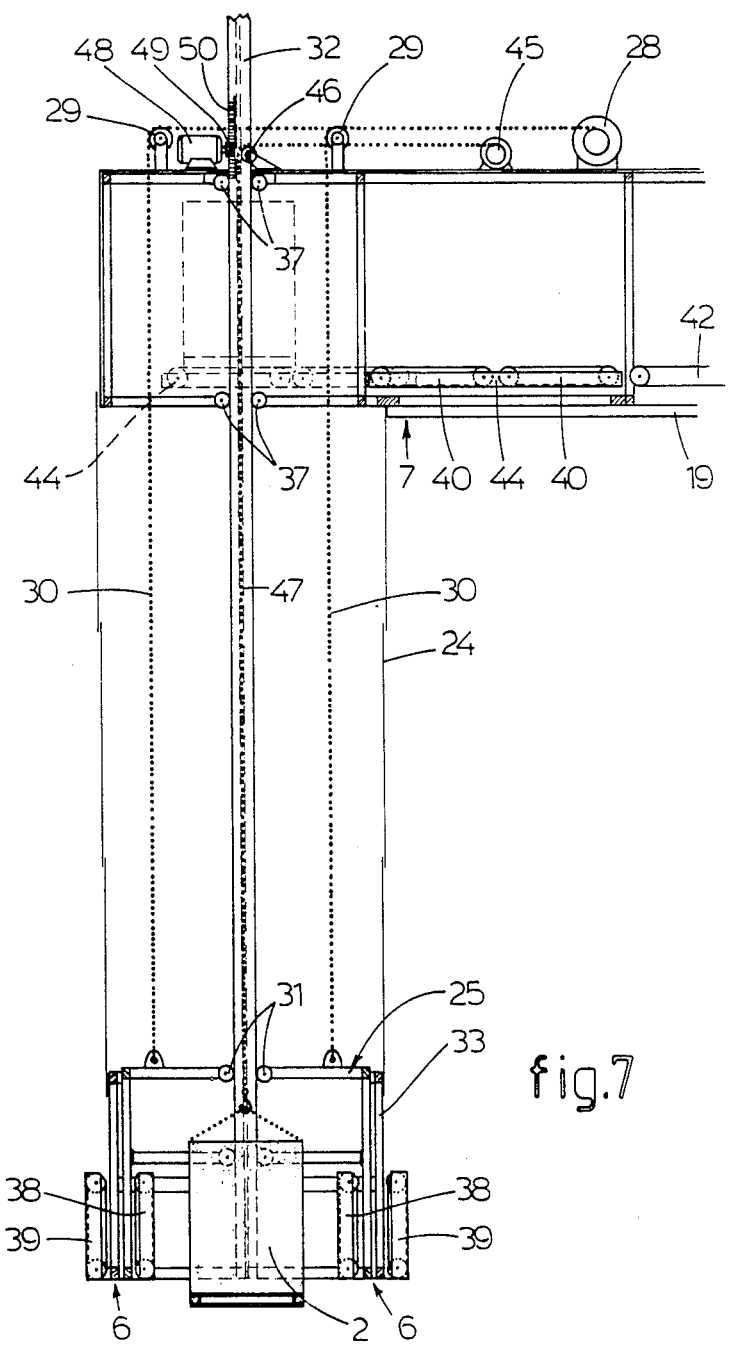

CONVEYING APPARATUS FOR LOADING AND UNLOADING GOODS, IN PARTICULAR FOR USE WITH SHIPS

The invention relates to a conveying apparatus for loading and unloading goods, in particular for use with ships, comprising a cage for transferring the goods, the cage being displaceable in vertical height by a hoisting means.

In a known embodiment of such a conveying apparatus the hoisting means is a hoisting crane provided with a hoisting cable, being able to hoist the cage from the quay into the hold of the ship and the other way round. The cage consists of an open container in which, in the case of goods piled up on pallets, one or more pallets are placed.

Herein it is a disadvantage that the goods are exposed to environmental influences during their stay in the cage, which, in particular with agrarian products, can lead to deterioration.

It is an object of the invention to provide a conveying apparatus of the type mentioned in the preamble, wherein this disadvantage is removed in an effective way.

For this purpose the conveying apparatus for loading and unloading goods, in particular for use with ships, according to the invention is characterized in that the cage is formed as a lift cage guided in a substantially vertical lift shaft having an encasement means and forming part of a cage lift, which is provided with a lower loading and unloading point and an upper loading and unloading point connected to a further conveyor having an encasement means.

In this way it is possible to convey the goods between a ship and a further store at the quay in a fully protected manner, so that the products cannot be affected by environmental influences.

In an advantageous embodiment of the conveying apparatus according to the invention the lift cage is provided with its own conveying means adapted to join to corresponding conveying means of the loading and unloading points of the cage lift.

In this way the goods are permitted to be transferred fully automatic from the loading and unloading points to the lift cage, and vice versa. This makes it possible to convey all kinds of goods, such as goods piled up on pallets, slip-sheets and the like as well as piece-goods, in a simple and reliable manner without the risk of damages.

Herein it is possible that the conveying means of the lift cage comprises at least one driven conveyor belt, of which the transport part is movable in a direction to the loading and unloading points of the cage lift.

In this embodiment it is favourable if the conveying means of the loading and unloading points of the cage lift comprises further conveyor belts, to which the conveyor belts of the cage can be connected.

In this way the goods can be put onto the conveyor belts of the loading and unloading points, while the lift cage is not around, whereafter, at the arrival of the lift cage, the goods are permitted to be directly transferred to the lift cage. Consequently a very rapid transport with a short cycle time is possible.

In a preferred embodiment of the conveying apparatus according to the invention said further conveyor belts of the lower loading and unloading point of the cage lift are provided on either side thereof, wherein it is advantageously that said further conveyor belts of the lower loading and unloading point of the cage lift are collapsible.

By this latter measurement it is possible to introduce the lift shaft of the cage lift also in cargo holds having a narrow entrance.

It is also advantageously when the conveying means of the lift cage is collapsible.

As a consequence thereof it is made possible to use the lift shaft of the cage lift also without utilizing the lift cage, since there is provided a free passage through the lift cage as a result of collapsing the conveyor belts.

In a further embodiment of the conveying apparatus according to the invention the upper loading and unloading point of the cage lift is provided with a number of conveyor belts arranged adjacent to one another in a direction transverse to the direction of conveyance of the goods, an equal number of conveyor belts of the lift cage being permitted to join to the conveyor belts of the upper loading and unloading point which are displaceable in said transverse direction, said further conveyor having an encasement means joining the conveyor belts of the upper loading and unloading point at the end facing away from the cage lift.

In this way a rapid transfer of goods between the lift cage and the upper loading and unloading point of the cage lift can take place, and the transverse sliding movement of the conveyor belts of the upper loading and unloading point permits the plural parallel flow of goods in the cage lift to be transformed into a single flow of goods in the further conveyor.

Herein it is an advantage if the further conveyor belts of the upper loading and unloading point of the cage lift are arranged on a slide being slidable transverse to the direction of conveyance of the conveyor belts, and it is also very favourable when the slide is slidably guided in a direction substantially parallel to the direction of conveyance of the conveyor belts, and may be introduced at least partially into the lift shaft.

A preferred embodiment of the conveying apparatus according to the invention is characterized in that the further conveyor connected to the upper loading and unloading point of the cage lift is provided with a buffer zone adjacent the upper loading and unloading point, the buffer zone comprising a number of separately driven buffer conveyor belts equal to the number of conveyor belts of the cage, and sensor means adapted to sense the presence of goods on the buffer conveyor belts of the buffer zone.

In this way the transfer of goods from the further conveyor to the upper loading and unloading point of the cage lift is allowed to take place fully automatically.

In a further development of the conveying apparatus according to the invention the frame of the lift shaft is rigidly connected to a part of a bridge adjacent the lift shaft, the bridge including the upper loading and unloading point of the cage lift and the further conveyor, said part of the bridge being connected slidably in the direction of conveyance of the further conveyor to a further part of the bridge, the bridge also being provided with wheels for moving the bridge along rails.

As a result it is possible to move the lower loading and unloading point of the cage lift into all directions in a horizontal plane in order to bring the lift shaft above the cargo hold of a ship.

In a advantageous embodiment of the conveying apparatus according to the invention the hoisting means of the lift cage is a hoisting cable of a seperate hoisting crane.

In this way it is permitted to utilize in a very effective manner hoisting cranes which are numerously available in harbour areas and inactive during a substantial part of the time.

Of course it is also possible to provide the conveying apparatus with its own hoisting means which, for example, may consist of a plurality of hoisting cables of a winch driving gear fastened to the lift shaft.

A favourable embodiment of the conveying apparatus according to the invention is characterized in that the lift shaft comprises an upper frame and a lower frame connected to the upper frame and being adjustable in vertical height.

Consequently the height of the lower loading and unloading point is adjustable and can therefore be adapted to the loading or unloading level of the ship.

The invention will hereafter be elucidated with reference to the drawing, which shows embodiments of the conveying apparatus for loading and unloading goods into and from ships according to the invention, by way of example.

FIG. 7 is a sectional view of the cage lift corresponding to FIG. 3, but showing another operating condition.

Figure 1:
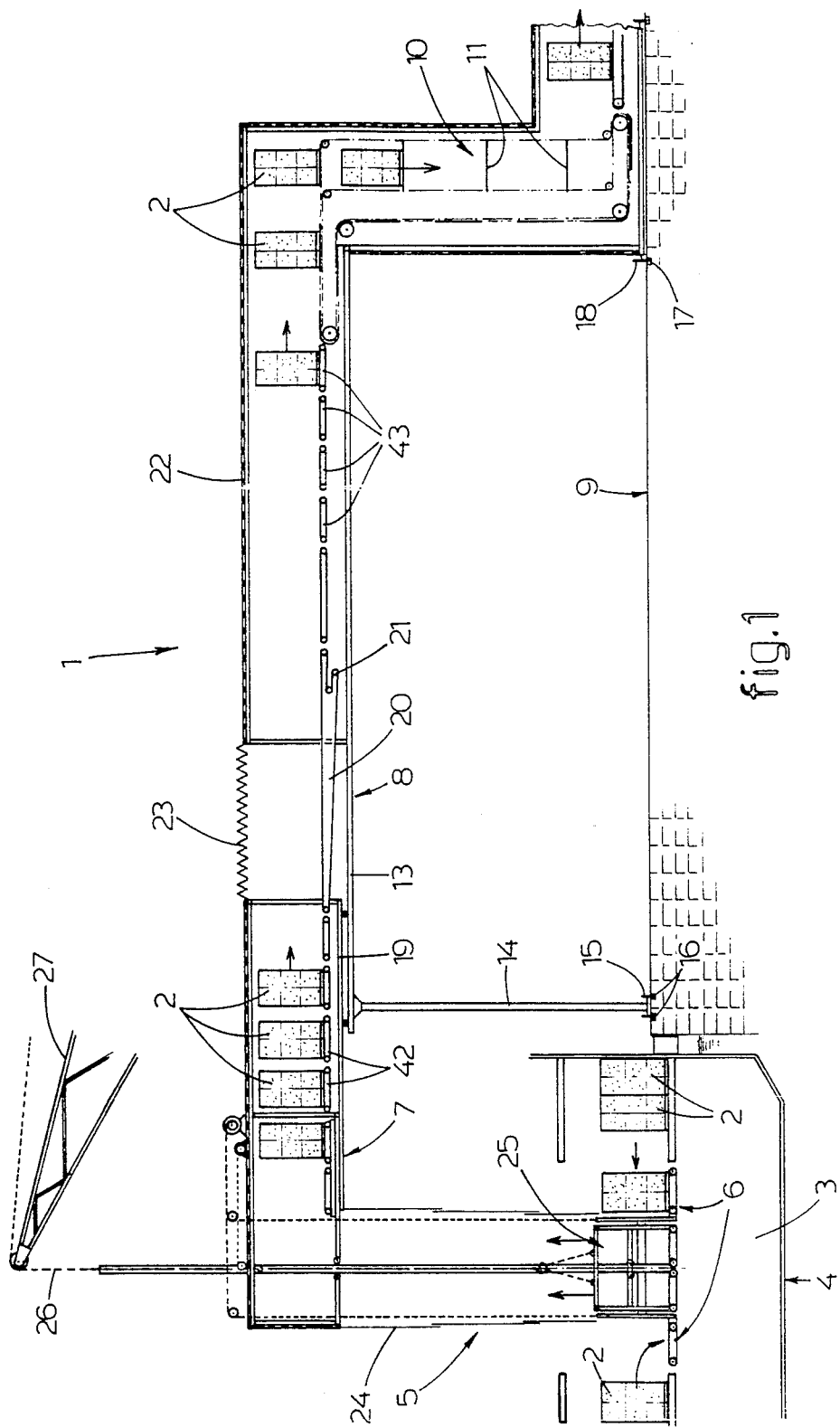
FIG. 1 is a schematical longitudinal sectional view of the conveying apparatus for loading and unloading goods into and from ships according to the invention.

Referring to FIG. 1, there is shown an apparatus 1, which is intended particularly for loading and unloading goods 2 piled upon pallets into and out of the cargo hold 3 of a ship 4. Of course it is also possible to handle other kinds of goods, such as piece-goods, by means of said apparatus 1.

The apparatus essentially comprises three sub-conveyors: a cage lift 5 including a lower loading and unloading point 6 introduceable into the cargo hold 3 and an upper loading and unloading point 7; a belt conveyor 8 connected to the upper loading and unloading point 7 of the cage lift and adapted to conduct goods horizontally to a spot above the quay 9; and a platform conveyor 10 connected to the end of the belt conveyor 8 facing away from the cage lift and adapted to convey goods in vertical height from and to the quay level.

This platform conveyor 10 having platforms 11 is of a structure known in the art and will therefore not be further elucidated. At the quay 9 further conveyors may be joined to the platform conveyor 10.

The belt conveyor 8 is arranged on a bridge 13, which is supported by the quay at the end adjacent the cage lift through a portal carrying wheels 15 at the lower side, with which the bridge is movable along rails 16 provided on the quay. The frame of the platform conveyor 10 connected to the bridge 13 is also provided with wheels 18 movable along rails 17.

The bridge 13 is formed into parts, of which part 19 adjacent the cage lift is slidably guided in the longitudinal direction with respect to the remaining stationary part of the bridge 13. The conveyor belts of both parts of the belt conveyor are connected to each other by means of a conveyor belt 20 adjustable in length and provided with a compensating loop 21.

The conveying apparatus 1 is constructed such that the goods 2 are allowed to be conveyed in a fully protected manner from the ship 4 to the store on the quay 9, so that adverse environmental influences cannot affect the goods. For this purpose the whole conveying apparatus 1 comprises an encasement 22 which, at the adjustable conveyor belt 20 of the belt conveyor 8, is formed as an accordion-structure 23 and is constructed as a telescopic well 24 around the cage lift 5 in order to be adaptable to changes in length.

Figure 2:
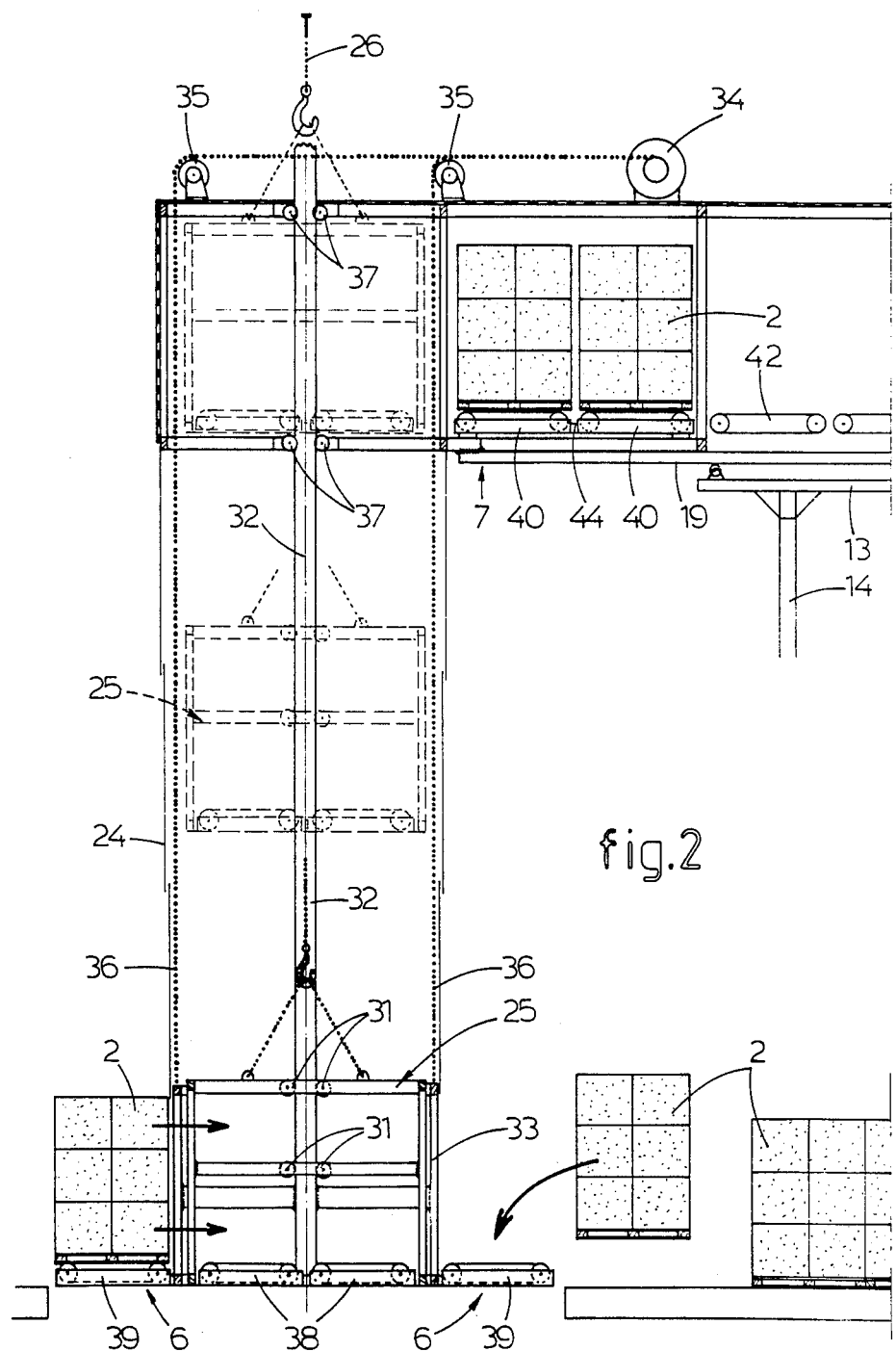
FIG. 2 is an enlarged sectional view of a part of the conveying apparatus of FIG. 1.

FIG. 2 shows the cage lift 5 of the conveying apparatus 1 on an enlarged scale. This cage lift 5 includes a lift cage 25, which is movable up and down by means of a hoisting means. For example, this hoisting means consist of a hoisting cable 26 of a separate hoisting crane 27 (see FIG. 1). In this way it is possible to very effectively use the hoisting cranes which are numerously available in harbour areas and are often inactive.

Figure 3:
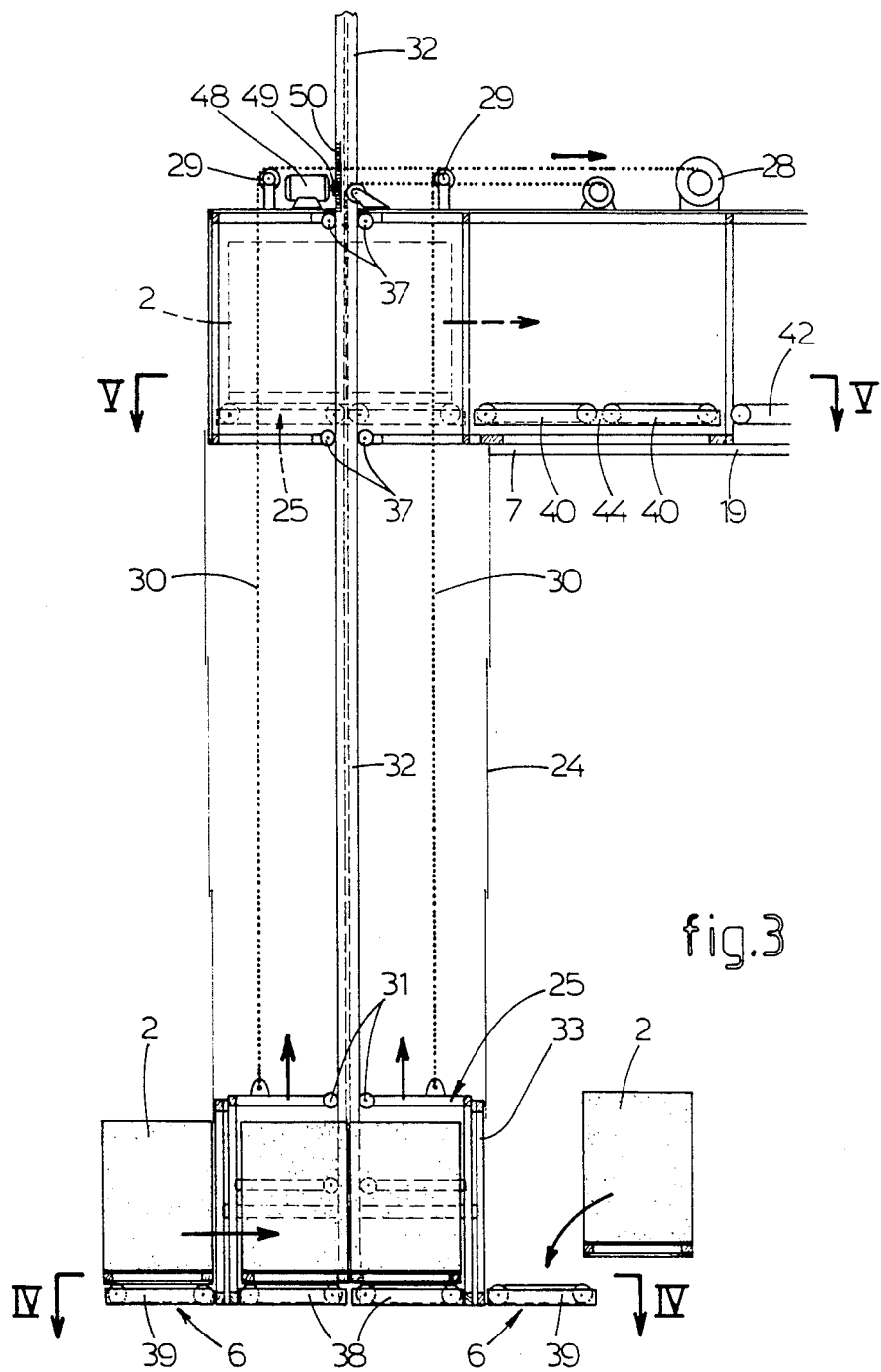
FIG. 3 is a sectional view corresponding to FIG. 2 illustrating a slightly modified embodiment of the conveying apparatus of FIG. 1.

As an alternative, the cage lift 5 may be provided with its own hoisting means, such as a driven winch driving gear mounted on the encasement 22 of the bridge 13, the cables 30 of the winch driving gear guided over rollers 29 engage onto the lift cage 25 (see FIG. 3).

When the lift cage 25 is moved it is guided by a plurality of guide rollers 31 rotatable about horizontal axes and engaging and rolling on the flanges of two I-beams 32 arranged at either side of the lift cage. These I-beams 32 are supported by and mounted to a frame 33 of the lower loading and unloading point 6 at the lower side.

The height of the lower loading and unloading point 6 is adjustable by means of a winch driving gear 34 mounted on the bridge part 19 of the conveying apparatus 1, wherein cables 36 of the winch driving gear 32 being guided over rollers 35 and engaging the top of the frame 33 of the lower loading and unloading point 6. This displacement is guided by guiding rollers 37 mounted to the bridge part 19 at the upper loading and unloading point 7 and rotatable about horizontal axes, the guiding rollers 37 engaging on both I-beams 32 and being adapted to roll thereon.

In the embodiment according to FIG. 3 the lower laoding and unloading point is adjustable in another way than by means of a winch driving gear, that is by means of at least one gear ring 49 driven by an electric motor 48 and being in engagement with a gear rack 50 mounted to one of the I-beams 32 and extending in the longitudinal direction thereof.

Figure 4:
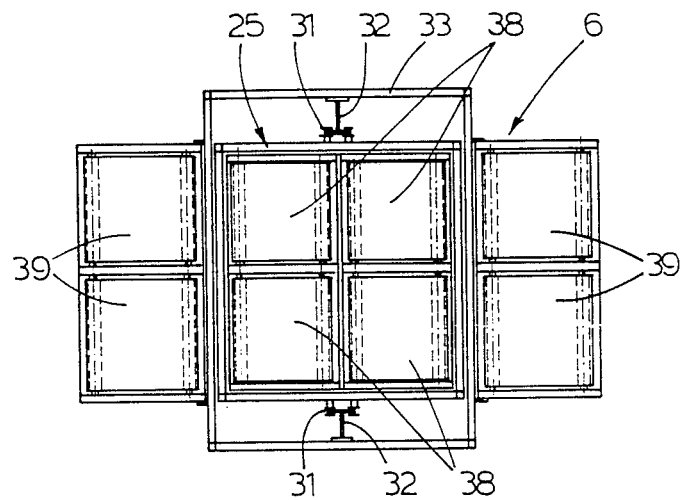
FIG. 4 is a sectional view along the line IV—IV in FIG. 3, wherein the arrangement of the conveyor belts of the lift cage and the lower loading and unloading point of the cage lift is illustrated.

The cage lift 25 has its own conveying means, with which the pallets can be brought to the right spot in the lift cage. This conveying means comprises four parallel driven conveyor belts 38 arranged in rows, side-by-side (see FIG. 4).

These conveyor belts can connect at the lower loading and unloading point to conveyor belts 39 arranged two by two on both sides of the lift shaft and mounted to the frame 33 of the lower loading and unloading point 6 pivotable about a horizontal axis. Consequently these conveyor belts 39 are collapsable when they are not in use or when the cage lift 25 is brought into or out of the hold of the ship.

The conveyor belts 39 of the lower loading and unloading point 6 serve as buffer for the goods piled upon the pallets when the goods 2 are put into or taken out of the lift cage 25 respectively.

Figure 5:
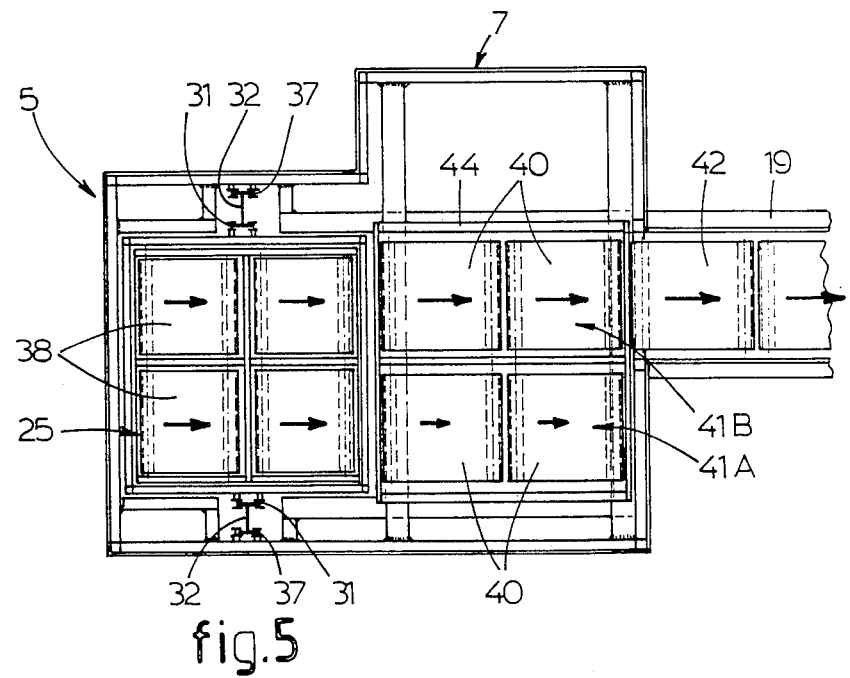
FIG. 5 is a section along the line V—V in FIG. 4, wherein the arrangement of the conveyor belts at the upper loading and unloading point of the cage lift is illustrated.
Figure 6:
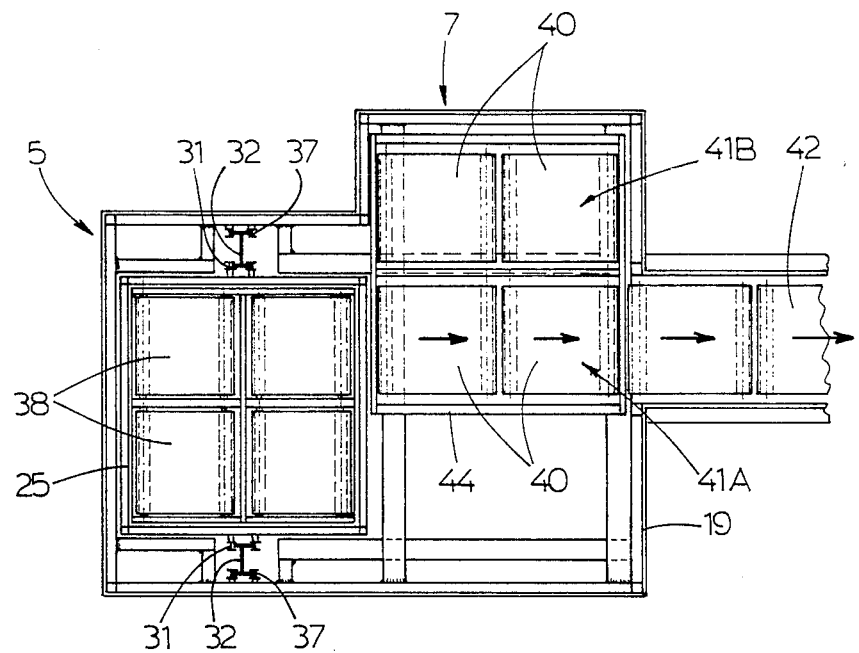
FIG. 6 is a sectional view corresponding to FIG. 5, wherein the conveyor belts of the lower loading and unloading point are shown in another position.

At the upper loading and unloading point 6 the conveyor belts 38 of the lift cage 25 can connect at one side to conveyor belts 40 mounted in the bridge part 19 adjacent the lift shaft. These conveyor belts 40, with a number of four, are placed in the same arrangement as the conveyor belts 38 of the lift cage 25, that is in two rows 41A and 41B of two conveyor belts 40, so that four pallets can be transferred in the same relative position between the lift cage 25 and the upper loading and unloading point 7 (see FIG. 5 and 6).

Adjacent the conveyor belts 40 of the upper loading and unloading point 7 facing away from the cage lift 25 a buffer zone is formed, comprising four buffer conveyor belts 42 arranged one after another in the direction of conveyance (FIG. 1).

The buffer conveyor belts 42 are drivable independently of each other. The driving thereof can be controlled by means of sensors adapted to sense the presence of goods on the buffer conveyor belts.

The belt conveyor 8 is provided with a similar buffer zone with buffer conveyor belts 43 adjacent to the platform conveyor 10, in order to ensure that the goods are transferred to a passing platform 11 of the platform conveyor 10 at the right moment.

The conveyor belts 40 of the upper loading and unloading point 7 are placed on a slide 44 which is slidable in a direction perpendicular to the direction of conveyance of the goods 2. The slide is slidable a distance in the transverse direction such that the conveyor belts 40 of the upper loading and unloading point 7 are aligned with the conveyor belts 38 of the connecting lift cage 25 and the row 41B of the conveyor belts 40 of the upper loading and unloading point 7 is aligned with the buffer conveyor belts 42 in the one extreme position, and the other roll 41A of the conveyor belts 40 of the upper loading and unloading point 7 is aligned with the buffer conveyor belt 42 in the other extreme position.

The slide 44 is not only slidably guided transverse to the direction of conveyance but also parallel to the direction of conveyance, such that the slide 44 can at least partially be introduced into the lift shaft.

FIG. 7 shows another operating condition of the cage lift 5. Herein pallets loaded with goods 2 and surrounded by slings are hoisted or lowered through the lift shaft. These goods packed in slings serve as last fill-up of the cargo hold 3 in a ship 4 at places where no fork-lift truck can be manoeuvred anymore.

In order to permit the goods 2 to pass through the lift cage 25 the conveyor belts 38 of the lift cage are collapsible in such a way that they stand against the sides of the lift cage 25 in the collapsed state.

In the embodiment according to FIG. 1 and 2 the hoisting means of the cage, that is the hoisting cable 26 of hoisting crane 27, may be utilized for hoisting the pallets with goods surrounded by slings, but in the embodiment shown in FIG. 7 a separate winch driving gear 45 having a hoisting cable 47 guided over a roller 46 is provided.

In order to deliver and take up the goods 2 packed in slings at the upper loading and unloading point 7 the slide 44 is extended into the lift shaft, such that the slide 44 with the conveyor belts 40 is lying in the hoisting path of the goods 2 packed in slings.

The operation of the conveying apparatus 1 according to the invention will now be elucidated with reference to the situation in which a ship 4 is being unloaded.

At first the lift shaft of the cage lift 5 of the conveying apparatus 1 is brought above the opened cargo hold 3 of the ship 4 to be unloaded and is lowered into the cargo hold 3 down to the upper layer of goods, in this case consisting of goods packed in slings. The conveyor belts 38, 39 of the lift cage 25 and of the lower loading and unloading point 6 of the cage lift 5 are in their collapsed condition. The hoisting cable 47 of the winch driving gear 45 is coupled to the slings of one of the loads 2 below the lift shaft, whereafter the load 2 is hoisted up to the top of the lift shaft. Hereupon the slide 44 of the upper loading and unloading point 7 is extended until it is lying below the load 2. The hoisting cable 47 is then paid out and uncoupled and the slide 44 is retracted again. The whole slide 44 is then slid transversely to a central position in which the load 2 is aligned with the connecting buffer conveyor belts 42. In this position the conveyor belts 40 and the buffer conveyor belts 42 are driven, such that the pallet with goods 2 moves away from the lift shaft, whereafter the pallet is further discharged through the belt conveyor 8 and the platform conveyor 10.

After retracting the slide 44 the hoisting cable 47 has already been lowered again and is able to hoist the next load in the manner described before.

When all the goods packed in slings are discharged, the remaining pallets with goods may be unloaded. For this purpose the lower loading and unloading point 6 of the cage lift 5 is locked at the level of the respective loading floor in the cargo hold 3 of the ship 4 and the conveyor belts 39 are swung downwards. Hereafter four pallets With goods 2 are put onto the conveyor belts 39 of the lower loading and unloading point 6, for instance by means of a fork-lift truck (FIG. 2 and 3). Thereupon the conveyor belts 38, 39 of both the lower loading and unloading point 6 and the lift cage 25 are driven such that the pallets are moved inwardly and are transferred from the lower loading and unloading point 6 to the lift cage 25. If the pallets stay at the right place in the lift cage 25 the hoisting means of the cage (the winch driving gear 34, or the hoisting crane 37 respectively) is started and the lift cage 25 is hoisted to the upper loading and unloading point 7. When it has been arrived at the upper loading and unloading point 7 the conveyor belt 38 of the lift cage 25 as well as the conveyor belts 40 of the upper loading and unloading point 7 are driven in the same sense such that the pallets of the conveyor belts 38 of the lift cage 25 are transferred to the corresponding conveyor belts 40 of the upper loading and unloading point 7. The driving of the conveyor belts 40 of the first row 41A stops as soon as the pallets are at their right place thereon. The driving of the conveyor belts 40 of the the second row 41B is only stopped when the corresponding pallets are transferred to the connecting buffer conveyor belts 42. As soon as this is accomplished the slide 44 is slid transversely until the first row 41A of conveyor belts 40 is aligned with the buffer conveyor belts 42. In this position, also the pallets on the first row 41A of the conveyor belts 40 are permitted to be transferred to the buffer conveyor belts 42 of the belt conveyor 8.

In the buffer zone adjacent the platform conveyor 10 the arriving pallets are temporarily stationed on the buffer conveyor belts 43 and are transferred one by one to the passing platforms 11 of the platform conveyor 10.

In the meantime, the lift cage 25 is lowered again after delivering the pallets in order to take up a new load of pallets. This new load of pallets already stands in readiness on the conveyor belts 39 of the lower loading and unloading point 6 so that, when the lift cage 25 has arrived at the lower loading and unloading point 6, the several pallets can directly be brought into the lift cage 25. In this way a rapid transport with a short cycle time is possible.

In the reverse sense, that is when a ship is loaded, the several steps as described will take place in the reverse sequence. A difference compared with unloading a ship is that in this case the buffer zone adjacent the upper loading and unloading point 7 of the cage lift 25 has the function to deliver the pallets to the conveyor belts 40 of the upper loading and unloading point 7 at the right time. For the rest the operation of the conveying apparatus 1 is the same as for unloading a ship.

The invention is not restricted to the embodiments shown in the drawing by way of example, which can be varied in different ways within the scope of the invention.

I claim:

1. Conveying apparatus for loading and unloading goods, in particular for use with ships, comprising
   a frame;
   a conveyor supported by the frame and being covered by a first encasement means;
   a cage lift provided with a lower loading and unloading point and an upper loading and unloading point connected to the conveyor, the cage lift comprising a substantially vertical lift shaft having a second encasement means and guiding means extending substantially vertically;
   a lift cage for conveying the goods, the cage being guided by the guiding means within the lift shaft and having a floor for carrying the goods, the floor being adapted to be opened in order to enable goods packed in slings and hoisted into or out of a ship's hold to pass through the lift cage;
   hoisting means connected to the lift cage for displacing the lift cage up and down within the lift shaft.

2. An apparatus as claimed in claim 1, wherein the floor of the lift cage is provided with a conveying means adapted to be aligned with corresponding means of the loading and unloading points of the lift cage and intended for transferring the goods between the lift cage and the loading and unloading points.

3. An apparatus as claimed in claim 2, wherein the conveying means of the lift cage comprises at least one driven conveyor belt, of which the transport part is movable in a direction toward the loading and unloading points of the cage lift 4. An apparatus as claimed in claim 3, wherein the conveying means of the loading and unloading points of the cage lift comprises further conveyor belts, to which the conveyor belts of the cage can be aligned with.

5. An apparatus as claimed in claim 4, wherein said further conveyor belts of the lower loading and unloading point of the cage lift are provided on either side of the lift shaft.

6. An apparatus as claimed in claim 5, wherein said further conveyor belts of the lower loading and unloading point of the cage lift are collapsible.

7. An apparatus as claimed in claim 2, wherein the conveying means of the lift cage is collapsible.

8. An apparatus as claimed in claim 4, wherein the upper loading and unloading point of the cage lift is provided with a number of conveyor belts arranged adjacent to one another in a direction transverse to the direction of conveyance of the goods, an equal number of conveyor belts of the lift cage being aligned with the further conveyor belts of the upper loading and unloading point which are displaceable in said transverse direction, said further conveyor aligning with the conveyor belts of the upper loading and unloading point at the end facing away from the cage lift.

9. An apparatus as claimed in claim 8, wherein both the lift cage and the upper loading and unloading point of the cage lift are provided with four conveyor belts arranged in two rows side-by-side, and the lower loading and unloading point of the cage lift including four conveyor belts arranged two by two at either side of the lift shaft.

10. An apparatus as claimed in claim 8, wherein the further conveyor belts of the upper loading and unloading point of the cage lift are arranged on a slide being slidable transverse to the direction of conveyance of the conveyor belts.

11. An apparatus as claimed in claim 10, wherein the slide is slidably guided in a direction substantially parallel to the direction of conveyance of the conveyor belts, and may be introduced at least partially into the lift shaft.

12. An apparatus according to claim 4, wherein the further conveyor belts connected to the upper loading and unloading point of the cage lift is provided with a buffer zone adjacent said upper loading and unloading point, the buffer zone comprising a number of separately driven buffer conveyor belts equal to the number of conveyor belts of the lift cage, and sensor means adapted to sense the presence of goods on the buffer conveyor belts of the buffer zone.

13. An apparatus as claimes in claim 12, wherein the lift shaft has a frame which is rigidly connected to a part of a bridge adjacent the lift shaft, the bridge including the upper loading and unloading point of the cage lift and the further conveyor belts, said part of the bridge being connected slidably in the direction of conveyance of the further conveyor belts to a further part of the bridge, the bridge also being provided with wheels for moving the bridge along rails.

14. An apparatus as claimed in claim 13, wherein the bridge connects to a vertical conveyor at the end facing away from the cage lift, the vertical conveyor being provided with a complete encasement means.

15. An apparatus as claimed in claim 1, wherein the hoisting means of the lift cage is a hoisting cable of a seperate hoisting crane.

16. An apparatus as claimed in claim 1, wherein the hoisting means of the lift cage comprises a plurality of hoisting cables of a winch driving gear fastened to the lift shaft.

17. An apparatus as claimed in claim 1, wherein the lift shaft comprises an upper frame and a lower frame connected to the upper frame and being adjustable in vertical height.

18. An apparatus as claimed in claim 17, wherein the lower frame of the lift shaft comprises two upright guide sections engaged by guide rollers of the lift cage and the upper frame of the lift shaft, at least one of the guide sections comprising a longitudinal gear rack engaging with a driven gear ring of the upper frame.

19. An apparatus as claimed in claim 14, wherein the vertical conveyor is a platform conveyor.

* * * * *